(12) United States Patent
Schaeding et al.

(10) Patent No.: US 10,940,883 B2
(45) Date of Patent: Mar. 9, 2021

(54) FREESTEERING SYSTEM FOR MOBILE MACHINES

(71) Applicant: GOMACO Corporation, Ida Grove, IA (US)

(72) Inventors: Chad M. Schaeding, Ida Grove, IA (US); Thomas C. Farr, Ellendale, MN (US)

(73) Assignee: Gomaco Corporation, Ida Grove, IA (US)

( * ) Notice: Subject to any disclaimer, the term of this patent is extended or adjusted under 35 U.S.C. 154(b) by 273 days.

(21) Appl. No.: 15/969,451

(22) Filed: May 2, 2018

(65) Prior Publication Data

US 2018/0327022 A1 Nov. 15, 2018

Related U.S. Application Data

(60) Provisional application No. 62/500,215, filed on May 2, 2017.

(51) Int. Cl.
| | |
|---|---|
| *B62D 6/00* | (2006.01) |
| *B62D 15/02* | (2006.01) |
| *B62D 9/00* | (2006.01) |
| *B62D 7/15* | (2006.01) |

(52) U.S. Cl.
CPC .......... *B62D 6/002* (2013.01); *B62D 7/1509* (2013.01); *B62D 9/00* (2013.01); *B62D 15/025* (2013.01)

(58) Field of Classification Search
CPC ..... B62D 6/002; B62D 7/1509; B62D 15/025
USPC ........................................................ 701/41
See application file for complete search history.

(56) References Cited

U.S. PATENT DOCUMENTS

| 4,116,294 | A | 9/1978 | Johnston |
| 6,134,486 | A | 10/2000 | Kanayama |
| 2006/0090438 | A1 | 5/2006 | Hunt et al. |
| 2017/0251589 | A1* | 9/2017 | Tippery ................ A01B 79/02 |
| 2017/0305190 | A1* | 10/2017 | Abramov ............ B60B 35/1036 |
| 2018/0284801 | A1* | 10/2018 | Guterman ............ G05D 1/0088 |
| 2018/0304709 | A1* | 10/2018 | Gibbs ..................... B60F 3/003 |
| 2018/0327022 | A1* | 11/2018 | Schaeding ............. B62D 6/002 |
| 2019/0351932 | A1* | 11/2019 | Washnock .......... F16H 25/2214 |
| 2019/0359257 | A1* | 11/2019 | Johnson .................... E02F 3/32 |

OTHER PUBLICATIONS

Haas, G., "Modeling and Calibrating a 4-Wheel Skid-Steer Research Robot", Sep. 2009, ARL-TN-0370, pp. 6-7.
Tu, X., "Robust navigation control and headland turning optimization of agricultural vehicles", Graduate Theses and Dissertations, 13188, 2013.
International Search Report and Written Opinion dated Aug. 6, 2018 for PCT/US18/30710.

* cited by examiner

*Primary Examiner* — Peter D Nolan
*Assistant Examiner* — Wae L Louie
(74) *Attorney, Agent, or Firm* — Suiter Swantz pc llo

(57) ABSTRACT

A mobile machine includes a computerized system for determining a synchronized free-floating center of rotation. The synchronized free-floating center of rotation effectively coordinates the rotation of the machine's tracks or wheels in that it constrains the angles of rotation. The synchronized free-floating center of rotation is calculated based on a line-line intersection derived from a combined attack angle and one or more known reference points. Such system may allow rotation and counter-rotation utilizing a uniform hydraulic pressure for hydraulically driven tracks.

20 Claims, 17 Drawing Sheets

FREESTEERING SYSTEM FOR MOBILE MACHINES

PRIORITY

The present application claims the benefit under 35 U.S.C. § 119(e) of U.S. Provisional App. No. 62/500,215 (filed May 2, 2017), which is incorporated herein by reference.

FIELD OF THE INVENTION

This invention relates generally to both the machines and a method for controlling the steering mobile construction machines, specifically precisely controlling the chassis and its attached implements.

BACKGROUND

Automatic steering systems for mobile ground engaging machines (construction, agricultural, mining, etc.) follow a path by utilizing a closed loop proportional-integral-derivative (PID) controller to minimize path tracking errors. A PID controller continuously calculates an error value based on a desired set point measured variable and applies a correction.

For restricted steering machines, i.e. front steer only, synchronization of individual tracks is mostly guaranteed by the mechanical/geometric design of the track system. Minimizing path tracking error is the primary objective for autonomous steering control, and as such is a major element of all steering control systems.

Counter-rotation implemented on skid steer, dozer, or similar two track machines with tracks/wheels rigidly fixed to the chassis works by travelling one side in forward and the other in reverse. On smaller equipment, counter-rotation by this method is called zero turn.

Other equipment, such as off-road forklifts, soil stabilizers, and Pavers provide crab, coordinated, and front/rear steer. When steerable tracks are included, either selectively or for all tracks, more complex, coordinated steering motions are possible.

Consequently, it would be advantageous if an apparatus and method existed for track and wheel steering to automatically steer machines along complex paths and curves.

SUMMARY

It at least one embodiment, a construction machine with a plurality of steerable tracks includes a computer system for dynamically steering the tracks and actuating forward and reverse movement in each track independently. Such system determines a center of rotation and corresponding track deflection and speeds to perform a rotation or counter-rotation.

In another embodiment, the computer system converts a complex path into arclengths, each arclength corresponding to a specific center of rotation, and dynamically locates centers of rotation to move the machine (or a corresponding tool) along each arclength.

A free-floating, dynamic center of rotation constrains the angles of a machine's tracks to a common center of rotation and associate those angles and track speeds to automatically apply appropriate parameters.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
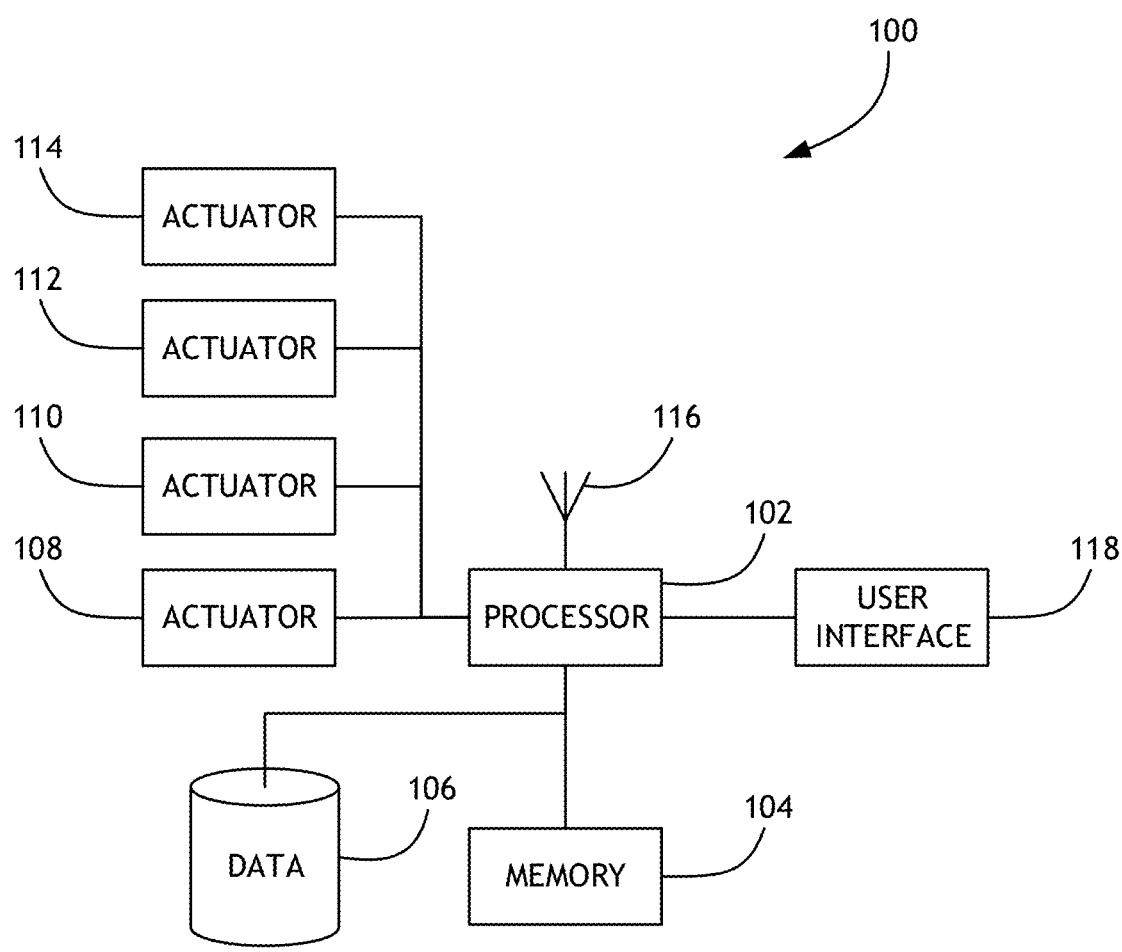
FIG. 1 shows a block diagram of an exemplary embodiment of a system for implementing the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Certain descriptions presented herein may be more fully understood with reference to *Steering system tailored to field requirements*, available at https://www.wirtgen.de/en/technologies/soil-stabilization/operating-principle/lenksystem_1.php; and X. Tu, "*Robust navigation control and headland turning*," Graduate Theses and Dissertations, Iowa State University—Ames, 2013.

Referring to FIG. 1, a block diagram of an exemplary embodiment of a system 100 for implementing the inventive concepts disclosed herein is shown. The system 100 includes a processor 102, memory 104 connected to the processor 102 for storing processor executable code, a data storage element 106 connected to the processor 102 for storing relevant path data as more fully described herein, and a plurality of actuators 108, 110, 112, 114, each associated with a track or wheel. The processor 102 dynamically actuates each of the actuators 108, 110, 112, 114 to turn the associated track or wheel to implement a path defined by the relevant path data. Such implementation may include dynamically shifting a center of rotation to produce complex, variable radii curves. The actuators 108, 110, 112, 114 may comprise elements for rotating the associated track, or linearly moving or adjusting the location of the corresponding track with respect to some reference point on the machine, or some combination thereof.

In at least one embodiment, the system 100 also includes one or more antennae 116 for wireless data communication, including communication to a satellite navigation system such as the global positioning system. The processor 102 receives positioning data to identify a real-world position of a machine including the system 100 and utilizes such positioning data in conjunction with the path data to apply correction algorithms to automatically adjust the plurality of actuators 108, 110, 112, 114 and maintain the machine along the desired path. In at least one embodiment, each of the plurality of actuators 108, 110, 112, 114 may be associated with a set of functions for correcting an identified deviation during a particular operational mode as more fully defined herein.

In at least one embodiment, an operator interfaces 118 with the system 100 via wired or wireless manual controller such as a joystick and conventional single knob steer dial (one input) and travel dial (one input). In at least one embodiment, the steer knob is configured via programmable parameters, i.e. the center of rotation axis (y value).

In at least one embodiment, the joystick has a conventional travel design (forward/reverse) by push/pull and a crab function via left/right. The machine may crab by moving a center of rotation about a "crab circle." In at least one embodiment, twisting the joystick may move the center of rotation to initiate a coordinate steering. With a single hand (joystick) the system 100 enables all the travel flexibility without switching modes.

In at least one embodiment, the interface 118 includes a graphic user interface (GUI) on a display such as a touch screen that allows a user to set/adjust parameters of the system 100 such as, but not limited to, speed, steer mode, and center of rotation positioning. During automatic operation such GUI may be the preferred interface. Furthermore, the system 100 may include some combination of interfaces 118 such as a dial to set speed and a joystick for steering, with auxiliary buttons for cruise control, lock steering, etc.

Referring to FIGS. 2A-2E, top views of a multi-track construction machine 200 according to embodiments of the inventive concepts disclosed herein are shown. The machine 200 includes a plurality of tracks 202, 206, 210, 214 (or wheels) with independent travel, each associated with one or more actuators 204, 208, 212, 216 that independently rotate the associated track 202, 206, 210 according to a set of functions to produce a desired path for the machine 200.

In at least one embodiment, all the tracks 202, 206, 210, 214 turn the same magnitude defined by the function $\tan^{-1}$ (length/width); the front tracks 202, 206 turn inward while the rear tracks 210, 214 turn outward. The center of rotation would be at the center of the chassis. The distance to each the tracks 202, 206, 210, 214 from the center of rotation is equal, as are the track speeds. Counter rotation is achieved by traveling each the tracks 202, 206, 210, 214 at the same speed, with one side traveling forward and the other side traveling in reverse.

A circumscribed circle of a polygon created by connecting the track centers (a rectangle in the present exemplary embodiment) includes the center of rotation (circumcenter) and the distance from center of rotation to each track (circumradius). The diversity of mobile machine designs and configurations both permits and restricts circumscription and counter rotation. Track locations having a circumscribed circle is called a concyclic machine configuration. Concyclic machine configurations include all regular polygons such as triangles, rectangles, and isosceles trapezoids, which are all common machine shapes; however, such layout does not guarantee the machine can counter rotate. The tracks 202, 206, 210, 214 also have to be free to turn to the desired angle and travel at equal speeds.

Maneuverability of the machine 200 is greatly improved by the ability to counter rotate, e.g. it turns in the smallest possible area. Concyclic machine configurations have a single circumradius that translates into a travel circuit of equal speeds. For hydraulic drives, equal travel speeds translate to equal fluid flow; which is a simple, affordable, and a highly effective travel circuit for relatively straight travel.

Figure 2A:
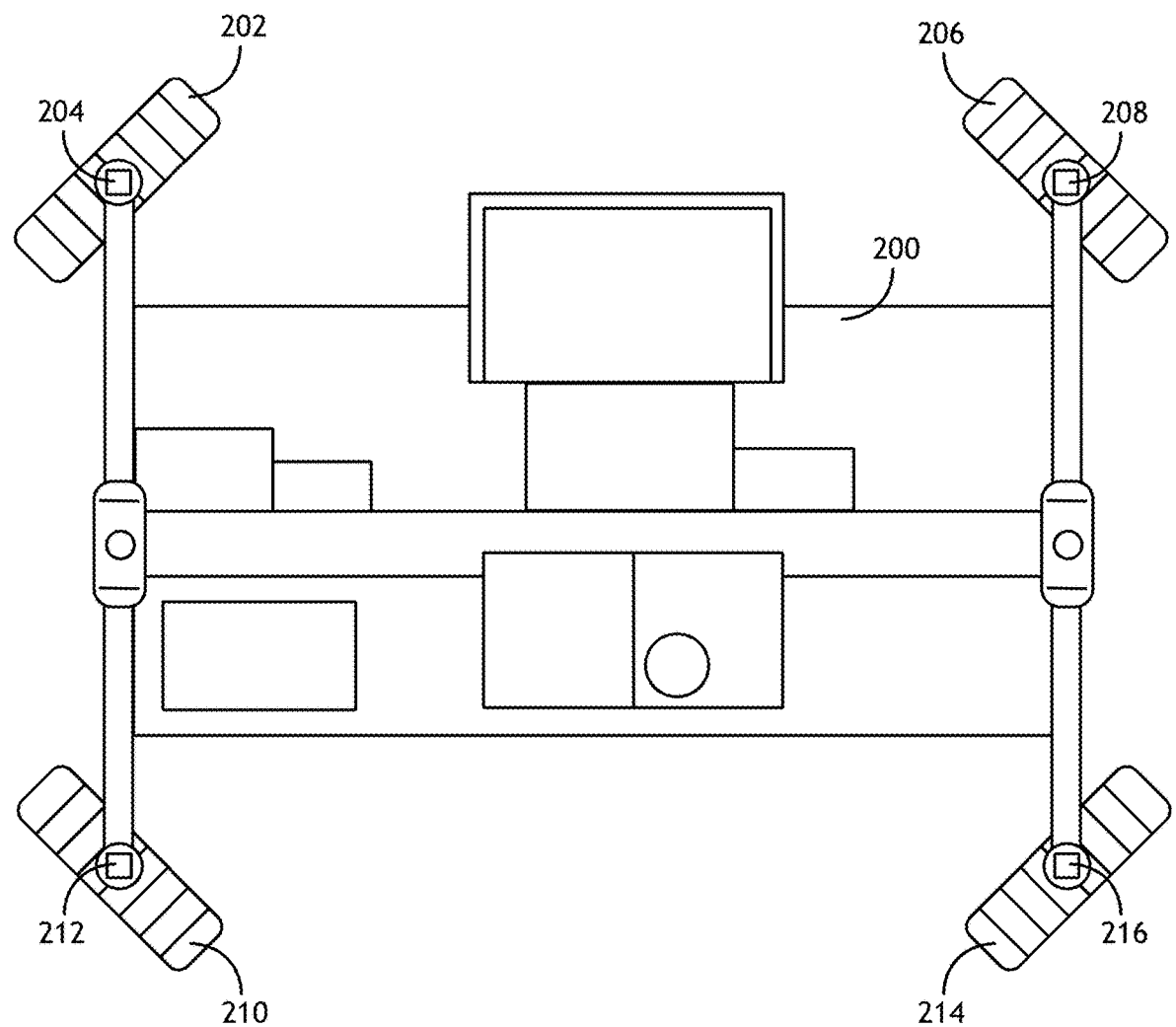
FIG. 2A shows a top view of a multi-track construction machine according to embodiments of the inventive concepts disclosed herein.
Figure 2B:
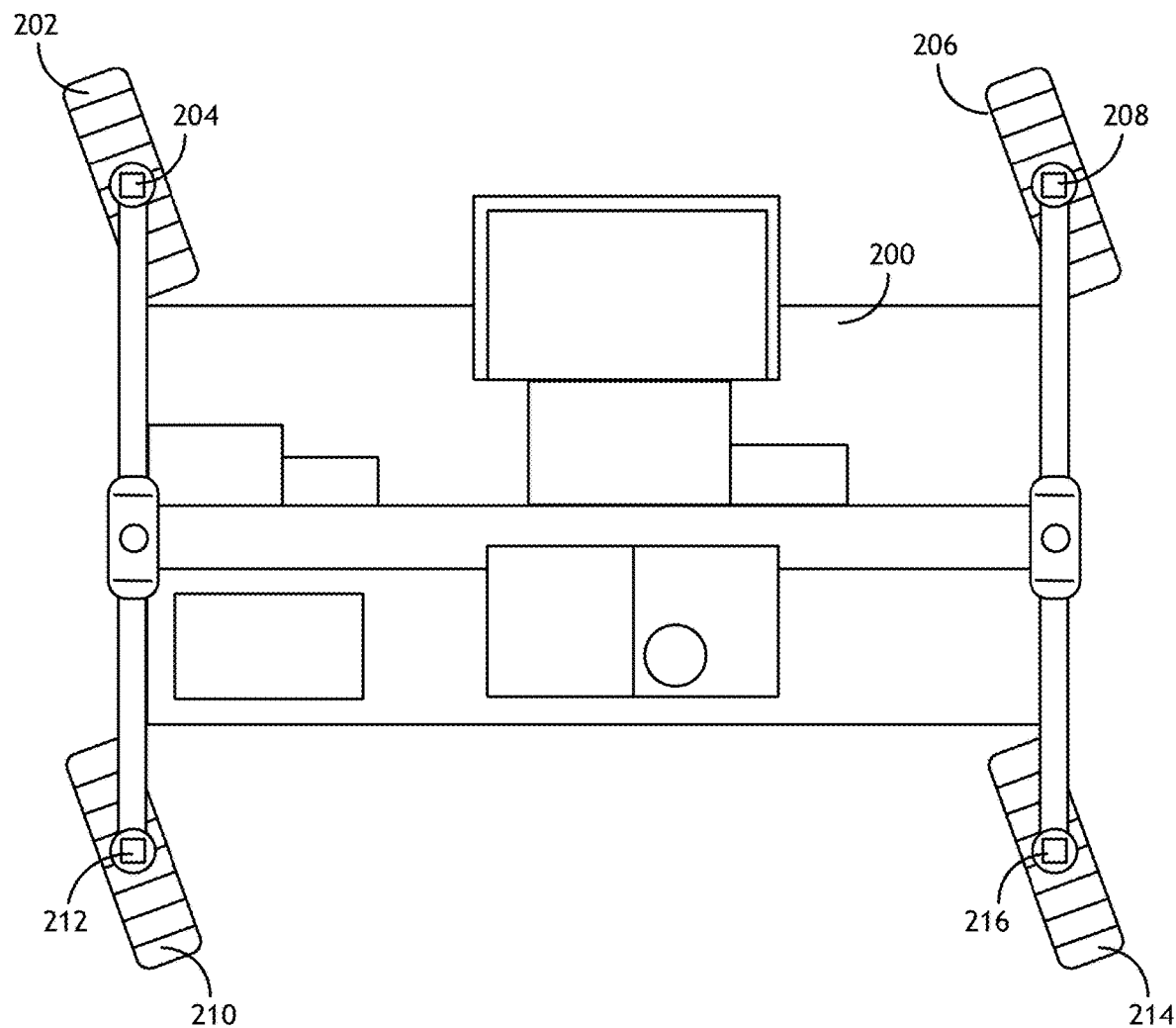
FIG. 2B shows a top view of a multi-track construction machine according to embodiments of the inventive concepts disclosed herein.
Figure 2C:
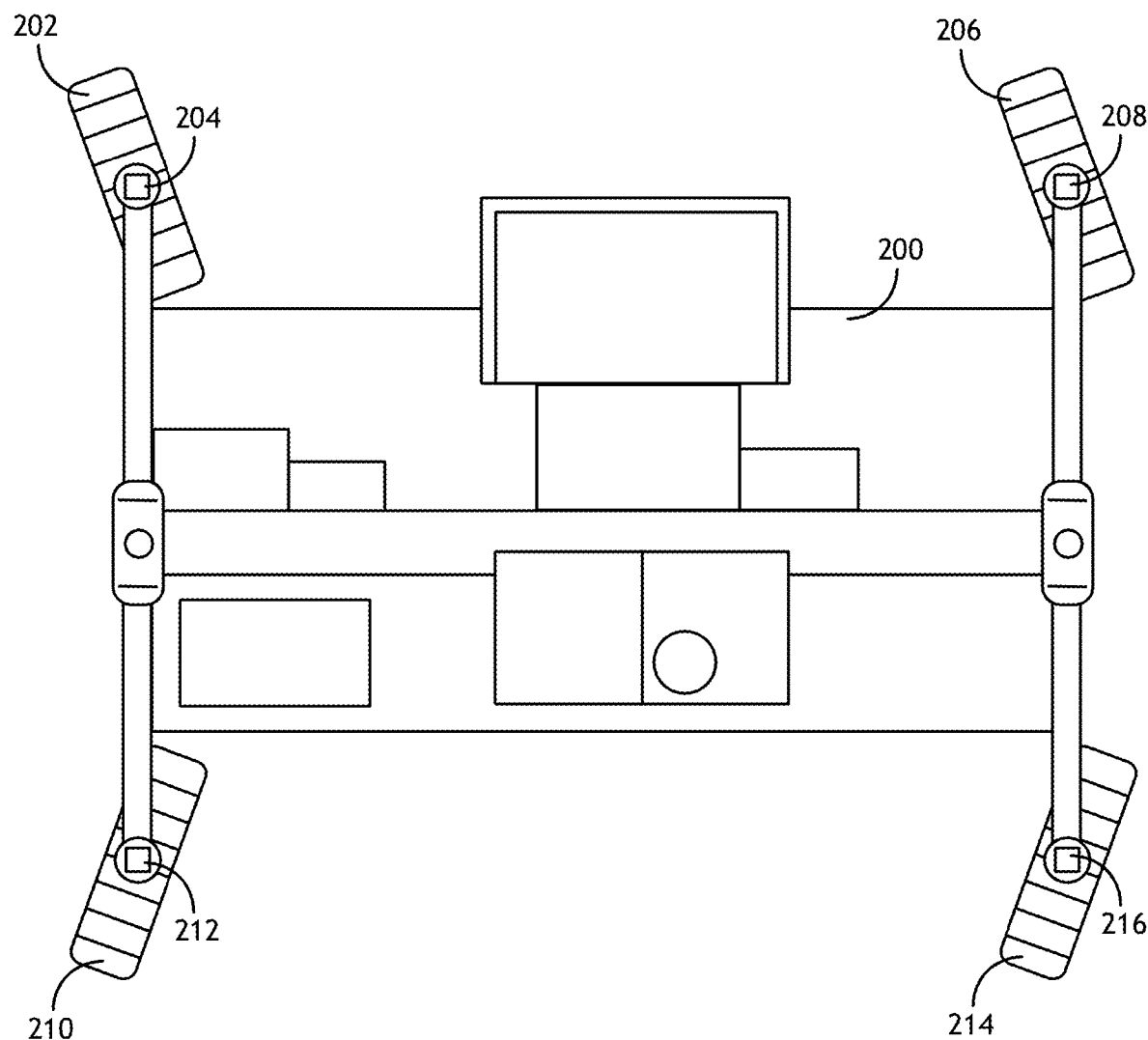
FIG. 2C shows a top view of a multi-track construction machine according to embodiments of the inventive concepts disclosed herein.
Figure 2D:
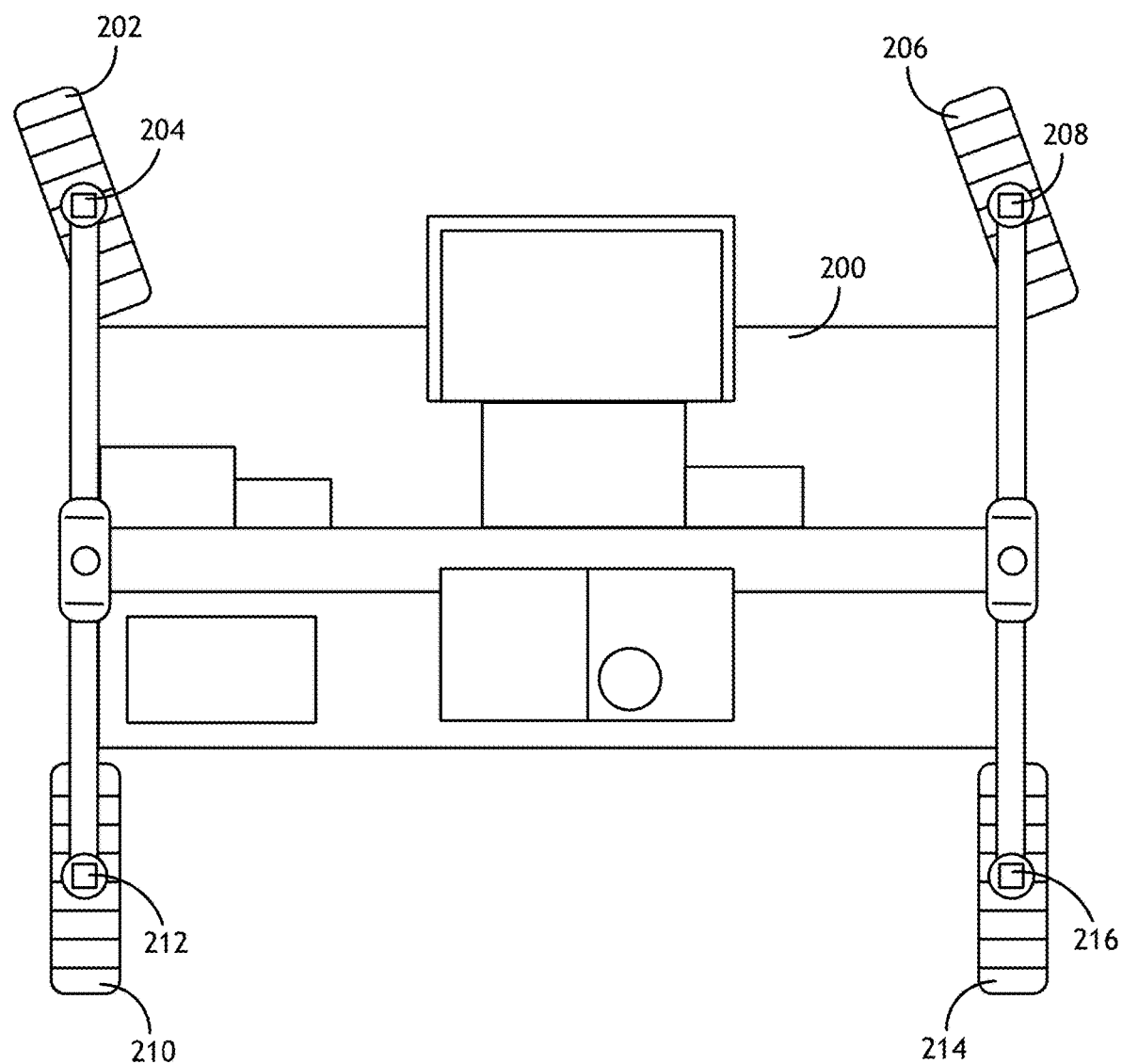
FIG. 2D shows a top view of a multi-track construction machine according to embodiments of the inventive concepts disclosed herein.
Figure 2E:
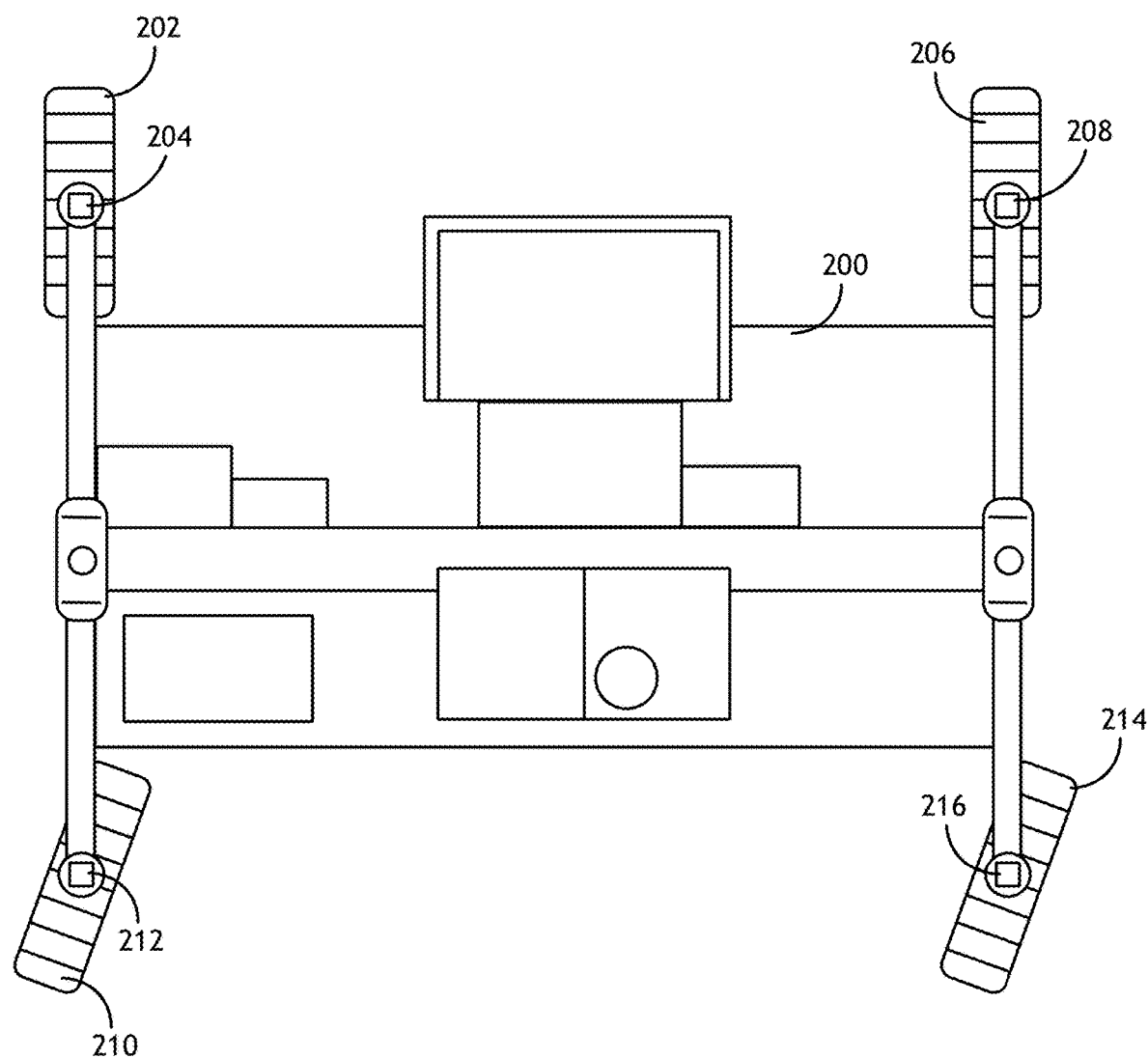
FIG. 2E shows a top view of a multi-track construction machine according to embodiments of the inventive concepts disclosed herein.

The machine 200 may be placed into a number of modes defined by the type of motion of the machine 200 and the location of a center of rotation. Referring to FIG. 2A, the machine 200 is shown in a rotation mode where each of the tracks 202, 206, 210, 214 is configured to rotate the machine 200 about a center of rotation within the footprint of the machine 200 without crabbing or other lateral movement. Referring to FIG. 2B, the machine 200 is shown in a crab mode where each of the tracks 202, 206, 210, 214 is configured to move the machine 200 linearly along a path; for some mathematical purposes, such motion may be modeled as a rotation with the center of rotation at infinity. Referring to FIG. 2C, the machine 200 is shown in a rotation mode where each of the tracks 202, 206, 210, 214 is configured to rotate the machine 200 about a center of rotation outside the footprint of the machine 200. Referring to FIG. 2D, the machine 200 is shown in a rotation mode where the front tracks 202, 206, are configured to rotate the machine 200 while the rear tracks 210, 214 are configured for linear movement; in such a mode, the front tracks 202, 206 may have different deflections. Referring to FIG. 2E, the machine 200 is shown in a rotation mode where the rear tracks 210, 214, are configured to rotate the machine 200 while the front tracks 202, 206 are configured for linear movement; in such a mode, the rear tracks 210, 214 may have different deflections.

Figure 3:
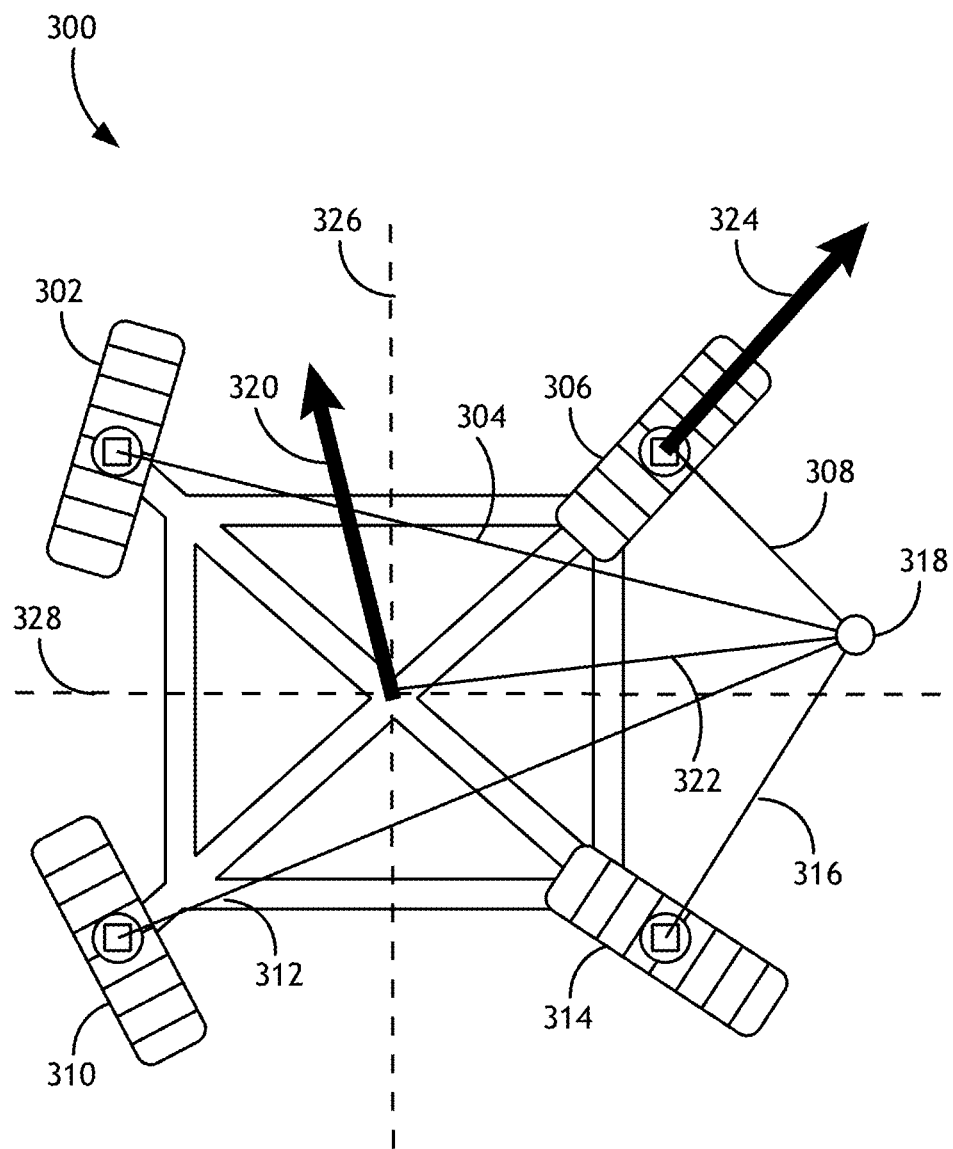
FIG. 3 shows a top view of a multi-track construction machine according to embodiments of the inventive concepts disclosed herein.

Referring to FIG. 3, a top view of a multi-track construction machine 300 according to embodiments of the inventive concepts disclosed herein is shown. The machined F_00 includes a plurality of tracks 302, 306, 310, 314 or wheels. In at least one embodiment, the machine 300 configured to rotate about a center of rotation 318 within a plane defined by a vertical axis 326 and a horizontal axis 328. The center of rotation 318 may be external to the footprint of the machine 300.

The configuration of the tracks 302, 306, 310, 314 may define or be defined by a direction of travel 320 orthogonal to a vector 322 from the center of rotation 318 to a fixed point of the machine 300. Furthermore, the direction of travel 320 may be continuously updated during rotation as the vector 322 is updated or to conform to a tangent of an arc associated with the rotation. Likewise, each track 302, 306, 310, 314 may be associated with a track specific vector 304, 308, 312, 316 from the center of rotation to define a deflection for each track 302, 306, 310, 314. For example, a second track 306 is associated with a second track specific vector 308 and corresponding direction of travel 324 with a deflection from either the vertical axis 326 or horizontal axis 328 to keep the direction of travel 324 tangential to an arc associated with the rotation. Each track 302, 306, 310, 314, or some subset of tracks 302, 306, 310, 314 in a machine 300 where one or more tracks 302, 306, 310, 314 are fixed, may have a specific deflection defined by each track's 302, 306, 310, 314 distance from the center of rotation 318.

Figure 4:
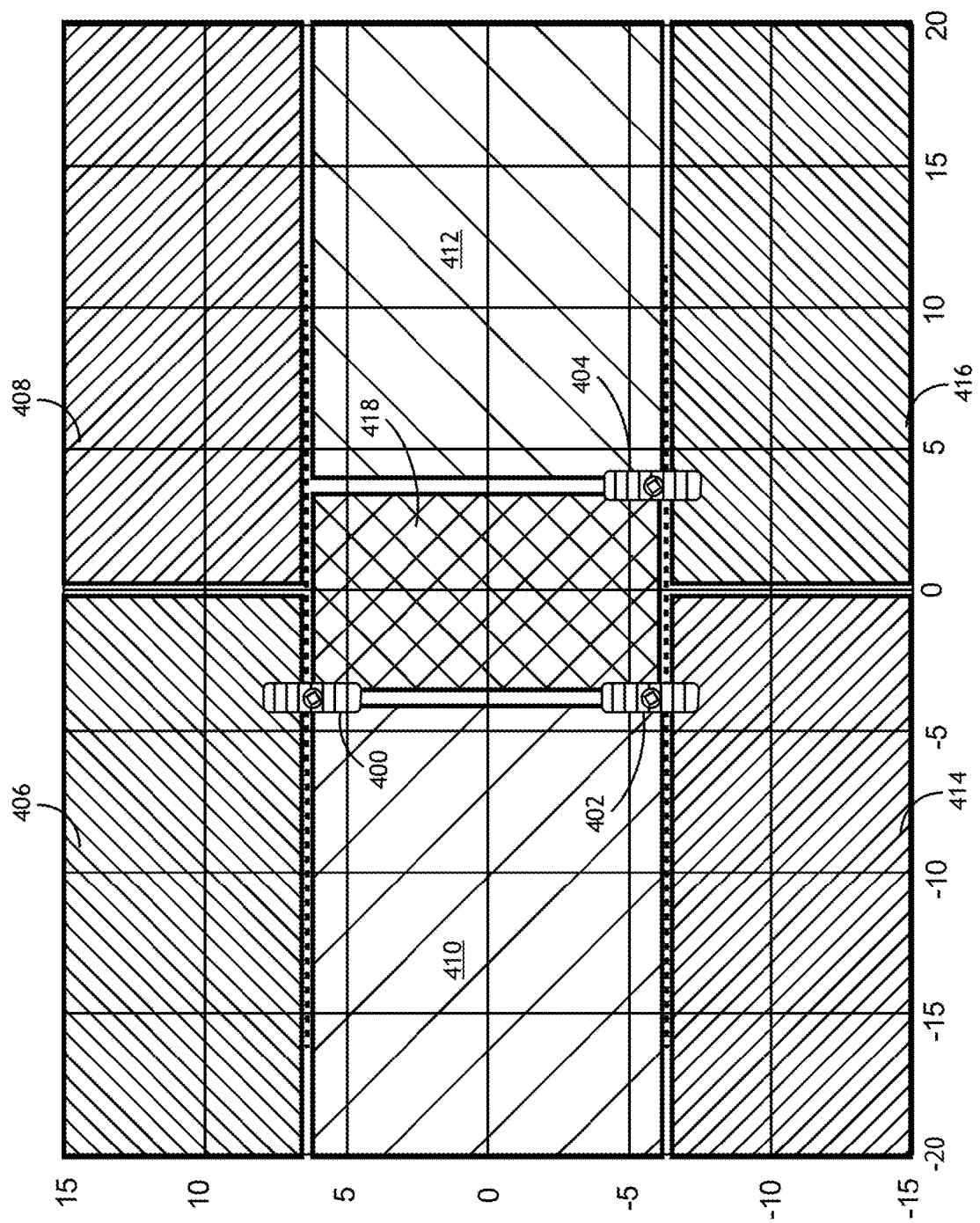
FIG. 4 shows a diagrammatic representation of steering mode zones for a multi-track construction machine according to embodiments of the inventive concepts disclosed herein.

Referring to FIG. 4, a diagrammatic representation of a space domain with steering mode zones 406, 408, 410, 412, 414, 416, 418 for a multi-track construction machine according to embodiments of the inventive concepts disclosed herein is shown. The center of rotation can be anywhere in the XY-plane. In at least one embodiment, the steering mode zones 406, 408, 410, 412, 414, 416, 418 include "crab right" zones 406, 416 defining the general direction of travel when the tracks 400, 402, 404 or wheels of the machine are in a crab right configuration; "crab left" zones 408, 414 defining the general direction of travel when the tracks 400, 402, 404 or wheels of the machine are in a crab left configuration; "coordinated left" and "coordinated right" zones 410, 412 when the tracks 400, 402, 404 or wheels of the machine are in a configuration to move left or right respectively; and a "counter rotate" zone 418 when the tracks 400, 402, 404 or wheels of the machine are in a configuration for rotation substantially within the footprint of the machine.

Each zone 406, 408, 410, 412, 414, 416, 418 may be associated with a track deflection scheme or set of functions for each track 400, 402, 404 based on a track specific vector within such zone 406, 408, 410, 412, 414, 416, 418 or a center of rotation with such zone 406, 408, 410, 412, 414, 416, 418. Such deflection schemes or functions may include variables based on the number and location of steerable tracks 400, 402, 404.

In at least one embodiment, counter rotation is not restricted to circumcircle rotation but may also be affected via minimum radius rotations. The center of rotation may be located within zone 406, 408, 410, 412, 414, 416, 418, inside or outside the machine chassis, and may be dynamically movable. Such embodiment may still allow for all existing modes of steering: front only, crab, coordinated, circumcircle counter rotation, etc. Further, such embodiment may enable other minimum, small, and large radius control: circumcircle rotations, non-cyclic intra body/chassis rotations and counter rotations, non-symmetric coordinated.

Figure 5:
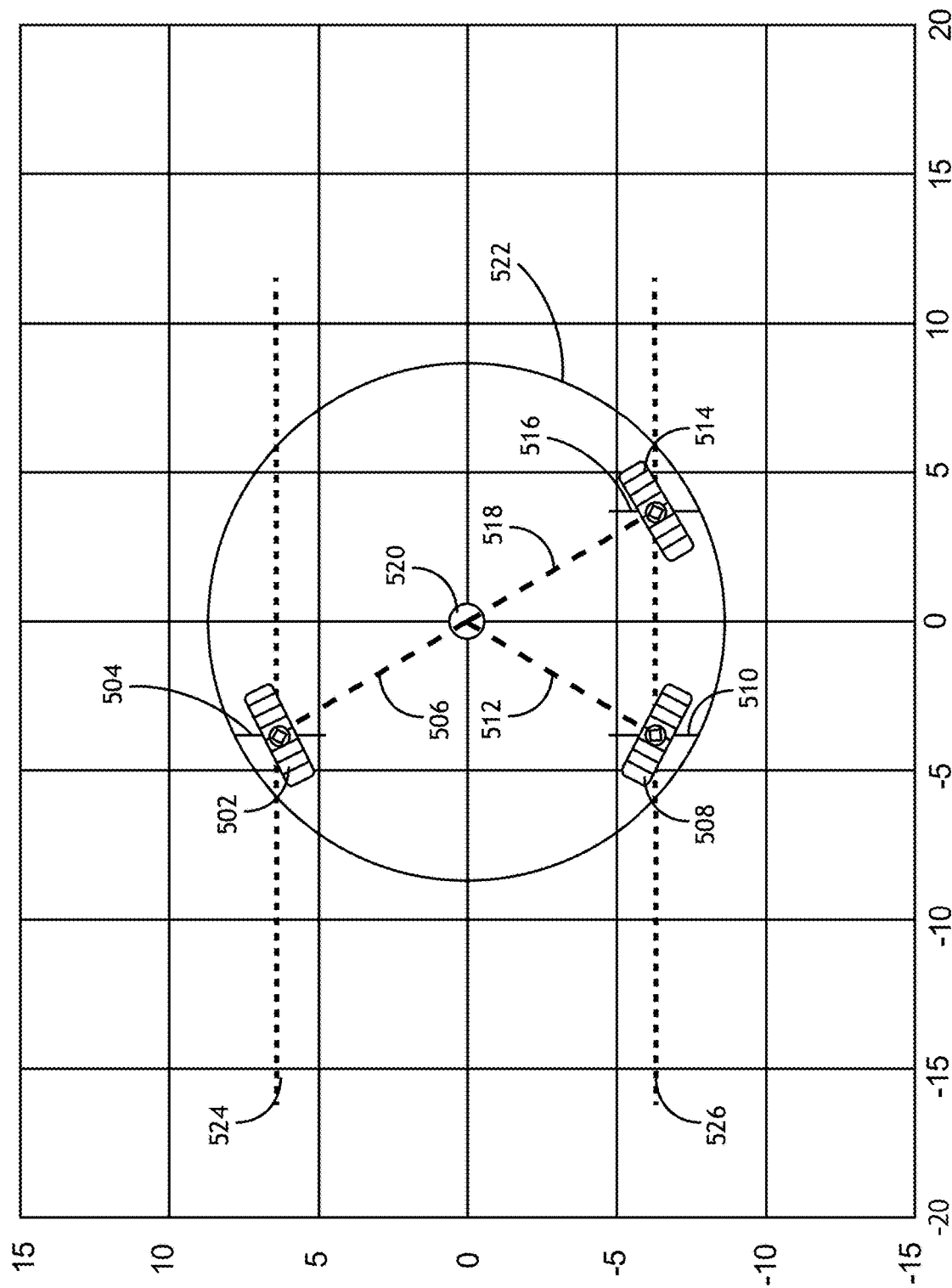
FIG. 5 shows a diagrammatic representation of a multi-track construction machine according to embodiments of the inventive concepts disclosed herein.

Referring to FIG. 5, a diagrammatic representation of a multi-track construction machine where a plurality of tracks 502, 508, 514 are bounded by a forward track position 524 and a rear track position 526, according to embodiments of the inventive concepts disclosed herein is shown. In at least one embodiment, each of the plurality of tracks 502, 508, 514 or wheels is associated with a neutral forward orientation 504, 510, 516 from which track deflections may be measured. In at least one embodiment, such deflections are based on a track specific vector 506, 512, 518 from a center of rotation 520 to the corresponding track 502, 508, 514 to produce a rotational path 522. FIG. 5 illustrates a center of rotation 520 within the footprint of the machine and the machine may be entirely contained within the rotational path 522.

The minimum turning radius for any mobile machine is a circumscribed circle and within the circumcircle radius of the machine. Such turns can be accomplished using both counter rotation and rotation. Counter rotation requires less range in turning angle of the tracks 502, 508, 514; rotation requires a single flow dividing travel circuit.

Figure 6:
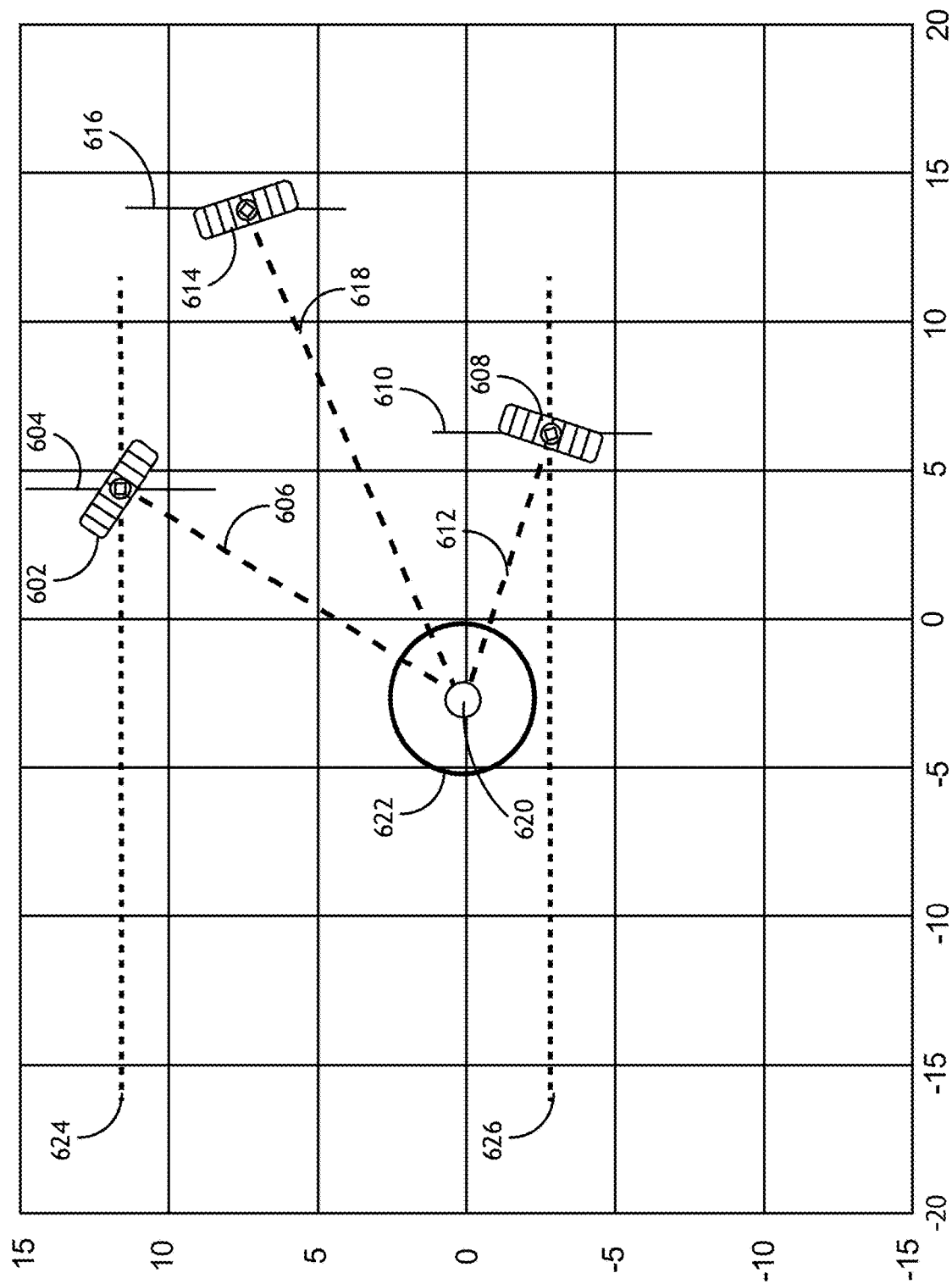
FIG. 6 shows a diagrammatic representation of steering mode zones for a multi-track construction machine according to embodiments of the inventive concepts disclosed herein.

Referring to FIG. 6, a diagrammatic representation of a multi-track construction machine where a plurality of tracks 602, 608, 614 or wheels are bounded by a forward track position 624 and a rear track position 626, and each of the plurality of tracks 602, 608, 614 is associated with a neutral forward orientation 604, 610, 616 from which track deflections may be measured. Such deflections are based on a track specific vector 606, 612, 618 from a center of rotation 620 to the corresponding track 602, 608, 614 to produce a rotational path 622. FIG. 6 illustrates a center of rotation 620 external to the footprint of the machine. Furthermore, the size (diameter) of the rotational path 622 may be defined by the lengths of the track specific vectors 606, 612, 618; that is to say the distance of each track 602, 608, 614 from the center of rotation 620. In at least one embodiment, the rotational path 622 defines a tool path for the machine.

Freely moving the center of rotation 620 to be on the transverse machine axis, for example corresponding to the rear extruding edge of a mold in a paving machine, guarantees that the exiting edge is tangent to a rotational path 622 both in straight and curved segments. Sliding the center of rotation 620 toward the forward track position 624 can move it toward, for example, a trimmer head cutting edge, and thus permit trimming tight radius segments before the extrusion process.

In at least one embodiment, sliding the center of rotation 620 in and out along the transverse axis of the molds extruding edge makes it possible to calculate target track angles for any size radius.

In at least one embodiment, the target track angles, travel rotation speed, and direction for any number of tracks 602, 608, 614 is known for a given center of rotation and correlated via a set of functions. For example, for a rotational path 622 corresponding to a 0.61 meter (2 ft) radius turn to the left (the center of rotation 620 being 0.61 meters left of the top back of a curb), the front tracks 602, 614 are required to turn left (negative deflection from the corresponding neutral forward orientations 604, 616) and the rear track 608 is required to turn right (positive deflection from the corresponding neutral forward orientation 610). Furthermore, all tracks 602, 608, 616 travel at different rates based on the radius of the path followed by such track 602, 608, 614; for example, the left front track 602 may travel along a path with a radius of 4.5 meters (14.7 ft), the right front track 614 may travel along a path with a radius of 4.66 meters (15.3 ft), and the left rear track 608 may travel along a path with a radius of 2 meters (6.6 ft).

In such exemplary embodiment, the machine may travel in forward or reverse. When traveling, the ratio of the radius values provides a target travel speed ratio; specifically, if the right front track 614 needs to travel 2.3 times faster than the left front track 602 and the left front track 602 travels 2.2 times faster than the left rear track 608.

If an operator sets the travel speed of the left rear track 608 to 2 meters/minute (6.6 ft/minute), the system would automatically set the left front track 602 to 4.5 meters/minute (14.7 ft/minute) and the right front track 614 to 4.66 meters/minute (15.3 ft/minute). The ratios are maintained for the tool or mold position. When offset in this fashion its speed is reduced by about ⅓ to about 0.61 meters/minute (2 ft/minute). If a constant, specific tool speed is desired the target track speeds may be determined and set accordingly.

In at least one embodiment, a control system may include relational functions for the tool and the tracks 602, 608, 614 such that an operator may set a track and speed for any track 602, 608, 614 or the tool and appropriate track deflections and speeds may be derived automatically.

In at least one embodiment, on board sensors sense repositioning in real-time, and update target track angles immediately for changing radius or track positions. In at least one embodiment, an operator inputs X, Y values using basic tape measuring of the relationship between components. Since the radius can be dynamically changing, the target angles are always updating.

Figure 7:
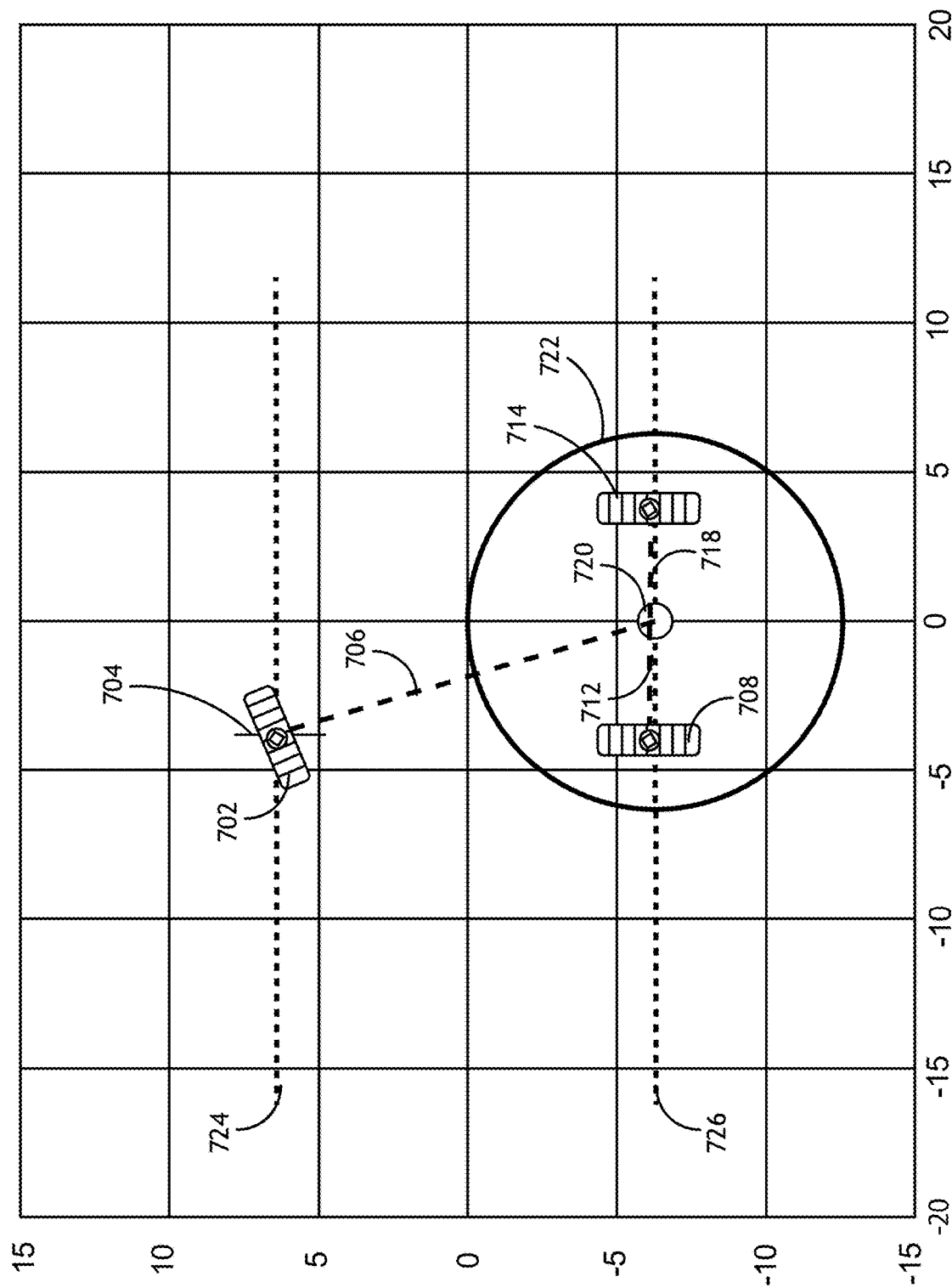
FIG. 7 shows a diagrammatic representation of a multi-track construction machine using front-steer according to embodiments of the inventive concepts disclosed herein.

Referring to FIG. 7, a diagrammatic representation of a multi-track construction machine using front-steer according to embodiments of the inventive concepts disclosed herein is shown. In at least one embodiment, the multi-track construction machine includes a plurality of tracks 702, 708, 714 or wheels bounded by a forward track position 724 and a rear track position 726. In at least one embodiment, one or more of the plurality of tracks 702, 708, 714 is fixed in an orientation while one or more of the plurality of tracks 702, 708, 714 may rotate; in FIG. 7, the front track 702 is configured to rotate while the rear tracks 708, 714 are fixed. The rotating front track 702 is associated with a neutral forward orientation 704 from which a track deflection may be measured. Such deflection is based on a track specific vector 706 while the fixed tracks 708, 714 may also define generally unmoving track specific vectors 712, 718 from a center of rotation 720 to produce a rotational path 722. FIG. 7 illustrates a center of rotation 720 within the footprint of the machine. Furthermore, the deflection of the front track 702 may define the location of the center of rotation 720 and the diameter of the rotational path 722, while the direction of the fixed tracks 708, 714 (either forward or backward) may correspond to the relative location of the track 708, 714 with respect to the center of rotation 722. In at least one embodiment, the rotational path 722 defines a tool path for the machine.

Referring to FIG. 7 specifically, and FIGS. 8-9 and FIGS. 10-11 generally; some machines, even those with a concyclic configuration, may not have the full range of all track steering angles required to satisfy the conditions of a counter rotation. For example, the machine shown in FIG. 7 has a triangular, concyclic layout, and can be circumscribed to have its center of rotation 720 at the circumcenter; however, the rear two tracks 708, 714 may have a limited turning angle such that it is not possible for a center of rotation 700 to be at the circumcenter. In such configurations, moving the center of rotation 720 to a midway point between the two rear tracks 708, 714 would still rotate the machine about a point within the machine's body, however it would require a larger area than a counter rotation. Because the distance from the center of rotation 720 to the front track 702 and rear tracks 708, 714 is different, the front track 702 turns faster in forward than the left rear track 708; furthermore, the right rear track 714 turns in reverse at the same speed as the left rear track 708.

In at least one embodiment, any rotation of the machine about a point within its chassis could satisfy the expectation of the user that a machine has a minimal area to turn in even if it is not a circumscribed circle. In such embodiment, the machine may have a non-concyclic shape, but such configuration would require at least one different track speed as compared to the remaining tracks 702, 708, 714. Furthermore, such machines necessarily have at least one track traveling in an opposite direction as compared to the remaining tracks 702, 708, 714. For those machines with only a single travel circuit, such differing track directions would require manually reconfiguring the hydraulic travel circuit to reverse the travel direction of the desired tracks 702, 708, 714.

Alternatively, if it is possible to rotate each track 702, 708, 714 in a coordinate steer fashion, i.e. the front track 702 rotates left and rear tracks 708, 714 rotate right to the correct amount; it is thereby possible to maintain forward travel on all the tracks 702, 708, 714 within the circumcircle.

Figure 8:
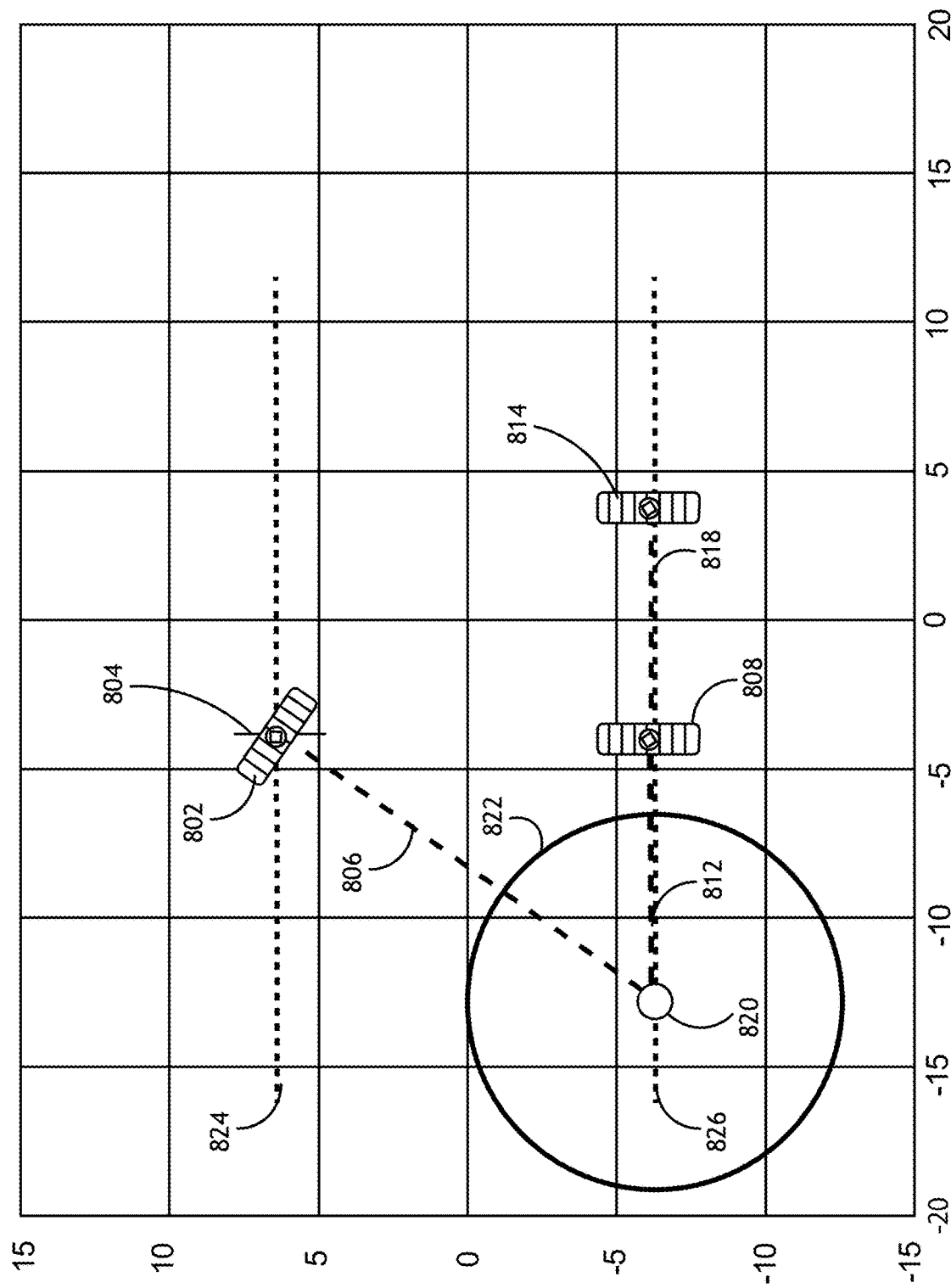
FIG. 8 shows a diagrammatic representation of a multi-track construction machine using front-steer according to embodiments of the inventive concepts disclosed herein.

Referring to FIG. 8, a diagrammatic representation of a multi-track construction machine using front-steer according to embodiments of the inventive concepts disclosed herein is shown. In at least one embodiment, the multi-track construction machine includes a plurality of tracks 802, 808, 814 or wheels bounded by a forward track position 824 and a rear track position 826. In at least one embodiment, one or more of the plurality of tracks 802, 808, 814 is fixed in an orientation while one or more of the plurality of tracks 802, 808, 814 may rotate; in FIG. 8, the front track 802 is configured to rotate while the rear tracks 808, 814 are fixed. The rotating front track 802 is associated with a neutral forward orientation 804 from which a track deflection may be measured. Such deflection is based on a track specific vector 806 while the fixed tracks 808, 814 may also define track specific vectors 812, 818 from a center of rotation 820 to produce a rotational path 822. FIG. 8 illustrates a center of rotation 820 exterior to the footprint of the machine. The deflection of the front track 802 defines the location of the center of rotation 820. In at least one embodiment, the rotational path 822 defines a tool path for the machine.

Figure 9:
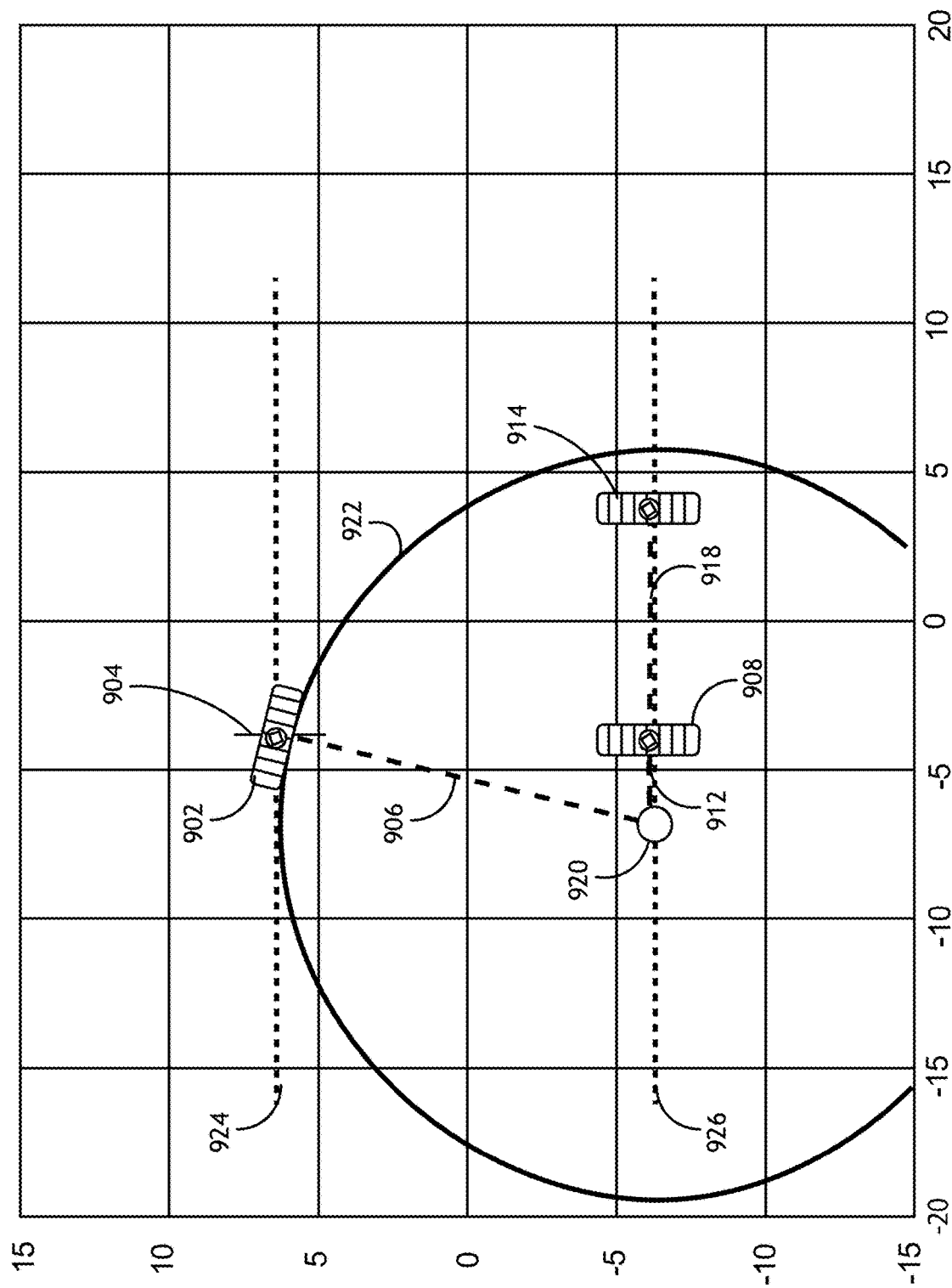
FIG. 9 shows a diagrammatic representation of a multi-track construction machine using front-steer according to embodiments of the inventive concepts disclosed herein.

Referring to FIG. 9, a diagrammatic representation of a multi-track construction machine using front-steer according to embodiments of the inventive concepts disclosed herein is shown. In at least one embodiment, the multi-track construction machine includes a plurality of tracks 902, 908, 914 or wheels bounded by a forward track position 924 and a rear track position 926. In at least one embodiment, one or more of the plurality of tracks 902, 908, 914 is fixed in an orientation while one or more of the plurality of tracks 902, 908, 914 may rotate; in FIG. 9, the front track 902 is configured to rotate while the rear tracks 908, 914 are fixed. The rotating front track 902 is associated with a neutral forward orientation 904 from which a track deflection may be measured. Such deflection is based on a track specific vector 906 while the fixed tracks 908, 914 may also define track specific vectors 912, 918 from a center of rotation 920 to produce a rotational path 922. FIG. 9 illustrates a center of rotation 920 exterior to the footprint of the machine while the rotational path 922 substantially corresponding to the path of the front track 902. In at least one embodiment, the rotational path 922 defines a tool path for the machine.

Figure 10:
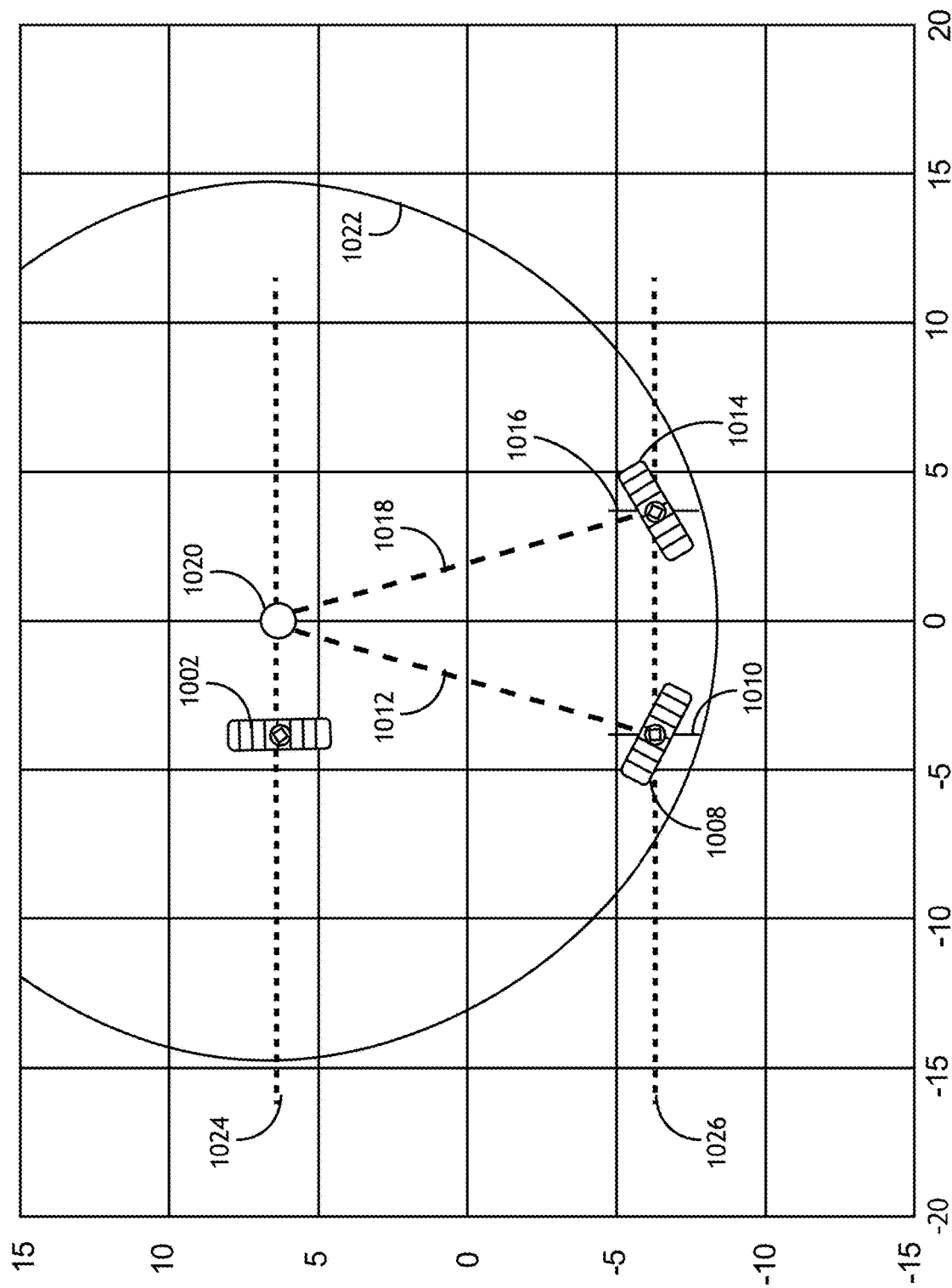
FIG. 10 shows a diagrammatic representation of a multi-track construction machine using rear-steer according to embodiments of the inventive concepts disclosed herein.

Referring to FIG. 10, a diagrammatic representation of a multi-track construction machine using rear-steer according to embodiments of the inventive concepts disclosed herein is shown. In at least one embodiment, the multi-track construction machine includes a plurality of tracks 1002, 1008, 1014 or wheels bounded by a forward track position 1024 and a rear track position 1026. In at least one embodiment, one or more of the plurality of tracks 1002, 1008, 1014 is fixed in an orientation while one or more of the plurality of tracks 1002, 1008, 1014 may rotate; in FIG. 10, the front track 1002 is fixed while the rear tracks _08, 1014 are configured to rotate. The rotating rear tracks 1008, 1014 are each associated with a neutral forward orientation 1010, 1016 from which a track deflection may be measured. Such deflections are based on a track specific vectors 1012, 1018 from a center of rotation 1020 to produce a rotational path 1022. FIG. 10 illustrates a center of rotation 1020 along the forward track position 1024. In at least one embodiment, the rotational path 1022 defines a tool path for the machine.

Figure 11:
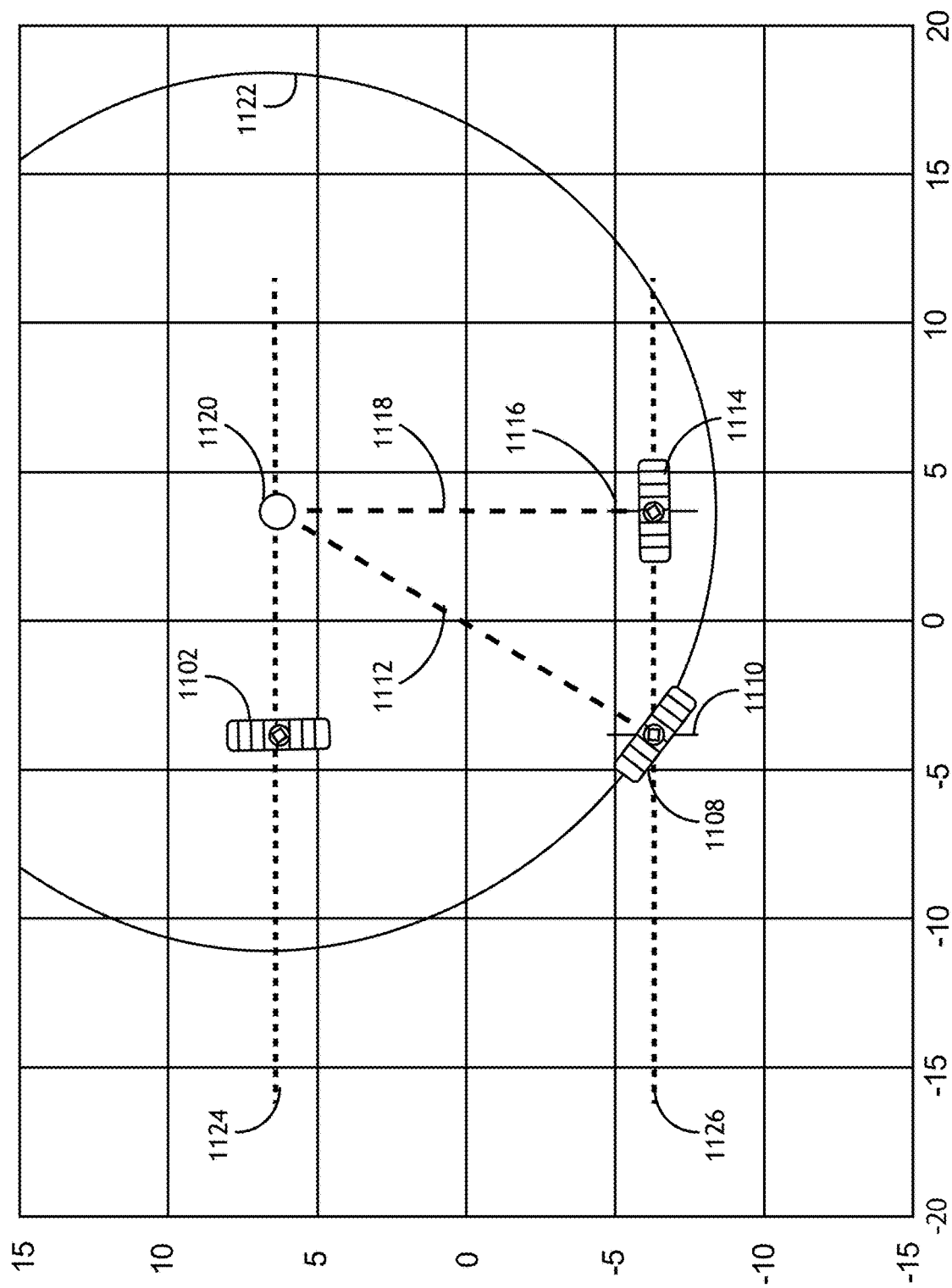
FIG. 11 shows a diagrammatic representation of a multi-track construction machine using rear-steer according to embodiments of the inventive concepts disclosed herein.

Referring to FIG. 11, a diagrammatic representation of a multi-track construction machine using rear-steer according to embodiments of the inventive concepts disclosed herein is shown. In at least one embodiment, the multi-track construction machine includes a plurality of tracks 1102, 1108, 1114 or wheels bounded by a forward track position 1124 and a rear track position 1126. In at least one embodiment, one or more of the plurality of tracks 1102, 1108, 1114 is fixed in an orientation while one or more of the plurality of tracks 1102, 1108, 1114 may rotate; in FIG. 11, the front track 1102 is fixed while the rear tracks _08, 1114 are configured to rotate. The rotating rear tracks 1108, 1114 are each associated with a neutral forward orientation 1110, 1116 from which a track deflection may be measured. Such deflections are based on a track specific vectors 1112, 1118 from a center of rotation 1120 to produce a rotational path 1122. FIG. 11 illustrates a center of rotation 1120 along the forward track position 1124 and along the neutral forward orientation 1116 associated with an orthogonal rear track 1114. In at least one embodiment, the rotational path 1122 defines a tool path for the machine.

With respect to the specific embodiments illustrated in FIGS. 5-11, arcs of the respective rotational paths 522, 622, _22, 722, 822, 922, 1022, 1122 may define a larger complete path enacted by periodic adjustments to the deflection of the respective tracks 502, 508, 514, 602, 608, 614, 702, 708, 714, 802, 808, 814, 902, 908, 914, 1002, 1008, 1014, 1102, 1108, 1114, to alter the center of rotation 520, 620, _20, 720, 820, 920, 1020, 1120 and diameter of the corresponding rotational path 522, 622, _22, 722, 822, 922, 1022, 1122. Furthermore, the composite path may be further defined by one or more variable radii curves and straight-line segments corresponding to a crabbing motion.

Figure 12:
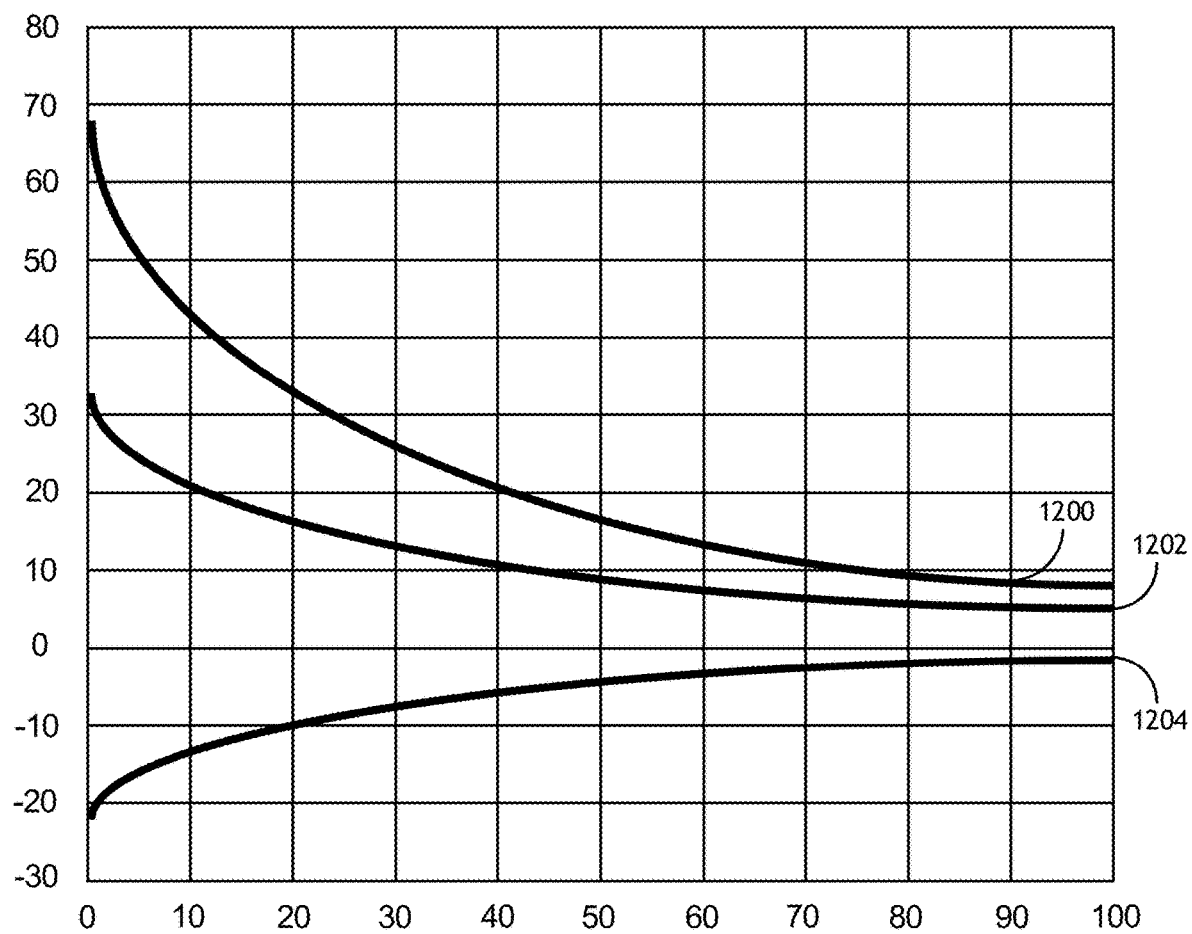
FIG. 12 shows a graph of steering track deflections associated with travel distance according to embodiments of the inventive concepts disclosed herein.

Referring to FIG. 12, a graph of steering track deflections 1200, 1202, 1204 associated with travel distance according to embodiments of the inventive concepts disclosed herein is shown. Steering track deflections 1200, 1202, 1204 are associated with the radius of a corresponding curve produced by such deflections 1200, 1202, 1204. Various embodiments may utilize different relations of track deflections 1200, 1202, 1204 to path curvature, or combinations of such relations, to produce a desired path comprised of various arc lengths. Furthermore, such relations may comprise a mechanism for corrective feedback by identifying a difference between an actual path and a desired path, converting such difference into a corrected curvature enacted by corresponding corrections to track deflections 1200, 1202, 1204.

In an automatic steering system, path tracking errors are generally corrected by calculating a path tracking error with reference to some positioning device such as a stringline sensor, total station, satellite positioning system, etc., and adjusting the track deflection 1200, 1202, 1204 and/or speed to move the machine in a direction to minimize the error (closed-loop control). Such adjustment may be done in forward or reverse but does require some motion to transition back toward the desired path. The path tracking error is an input to a steering authority function that produces a closed loop attack angle.

$$y(\text{angle}) = f(\text{millimeters, tuning parameters})$$

The steering authority function may be dampened or loose, i.e. 3 mm (⅛ inch) corresponds to 1 degree, or hot and aggressive, for example 3 mm (⅛ inch) corresponds to 10 degrees. For straight and nearly straight paths, only path tracking errors and closed loop control can sufficiently steer a machine to maintain the desired path alignment.

For very specific machine configurations, for example with mold and tracks all extended out, and the rear steerable tracks in-line with the mold exit, only the rear track needs steering adjustment to correct for path tracking error. A front stringline sensor for such machine must be precisely positioned longitudinally (front to back) and vertically to make the above function satisfy the maximum track angle for a preprogrammed tracking error.

When the rear steerable track is not in-line with the tool, a non-zero angle is required, which could only be produced if a path tracking error is present. Such requirement conflicts with the desire to minimize path tracking errors.

A system utilizing embodiments of the present invention may correct tracking errors by first turning each track to a target track angle (open loop). Then when path tracking errors are measured such as by string, 3D, etc. and converted to an attack deflection angle, the attack angle for each track is set to the addition of the angles. For example, where a left front track angle is set to 67 degrees and a right front track angle is set to 28 degrees. The system then measures a ½ inch path tracking error and tunes or correlates that error to a 4-degree attack deflection angle.

Ackermann steering would apply this angle at the centerline of the chassis, where the outside would receive a 2-degree correction and the inside would receive a 6-degree correction. Depending on the direction of the error the resulting corrected angles would be 73 and 30 degrees or 61 and 26 degrees. If a rear steerable track has no error and no additional attack deflection, there would be no correction to the rear track however it could also have a path tracking error that is in either direction (left or right of the desired path).

For tight (small) path tracking errors and thus small attack deflection angles, the tracks and travel speeds stay well synchronized and the steering system remains stable; however, the Ackerman methodology does not guarantee a common center of rotation for larger errors.

In at least one embodiment, a method for correcting tracking errors includes measuring the path tracking errors as a distance and converting the distance error into attack deflection angles at the reference points on the machine (i.e. the front and rear of the chassis, the front and rear of the mold, etc.). The errors can be zero, be in the same direction, different directions, or any combination thereof.

Once the error is measured, target reference point angles are calculated from the same reference points. The target and attack deflection angles are added to produce combined attack angles. Based on the reference point positions and the combined attack angle, a synchronized center of rotation is calculated from a solution of a line-line intersection. Target track angles and travel speed rotations are determined based on the updated synchronized center of rotation. The target track angles and travel speeds are then implemented by a controller to minimize path tracking error.

In some embodiments, a system implementing the methods checks the angles and travel speeds to ensure they remain synchronized within a predefined tolerance and modify the target values accordingly.

In some embodiments, for certain shapes and setups it is desirable to tolerate path tracking errors for improved production rates, moving the machine faster. Such a system may be designed with that option available and when chosen, a secondary objective may smooth transitions between elements with vastly different radii (spiral).

Figure 13:
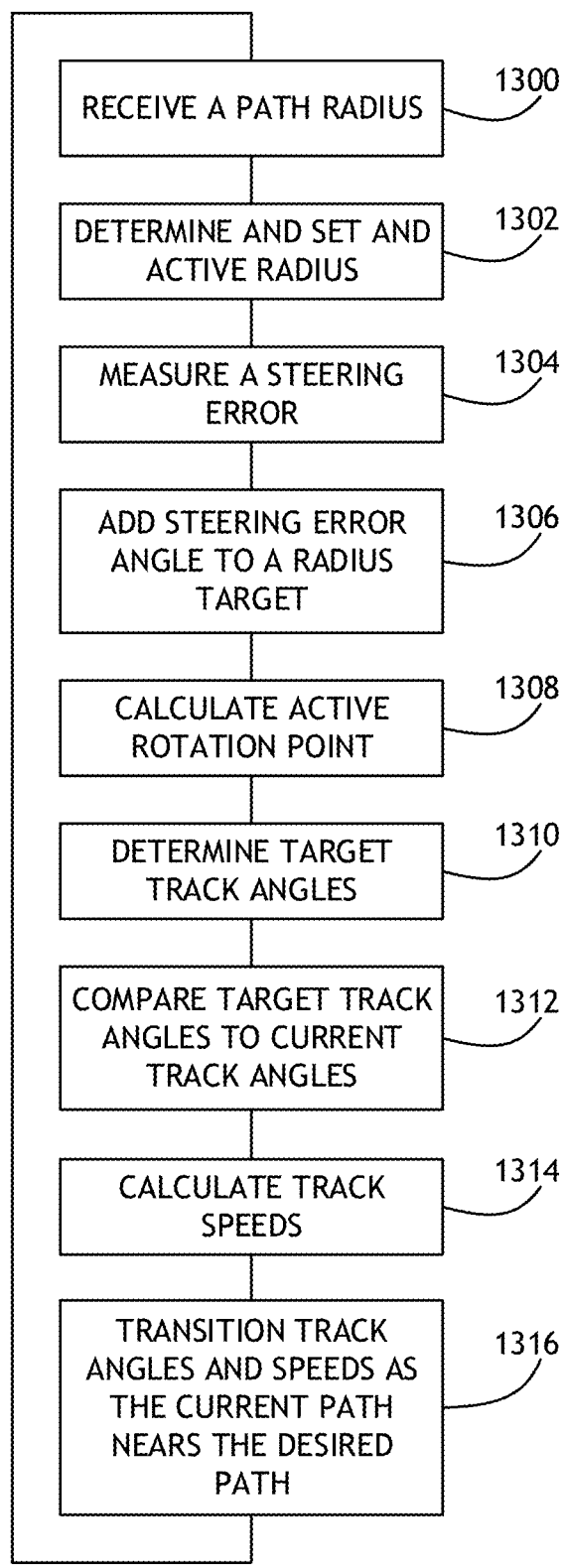
FIG. 13 shows a flowchart of a method for steering a machine according to embodiments of the inventive concepts disclosed herein.

Referring to FIG. 13, a flowchart of a method for steering a machine according to embodiments of the inventive concepts disclosed herein is shown. A path radius is received 1300, either from a database or via operator input. For spiral transitions or variable radius paths, a current active radius is set 1302. Steering error is measured 1304 based on the known position of the machine and one or more reference markers. The steering error angle is added 1306 to a radius target angle at an authority point and an active rotation point is calculated 1308. Based on the active rotation point, target track angles are calculated or otherwise determined 1310 with reference to a table or set of functions and checked against known machine limitations; if limitations are exceeded, track angle may be recalculated based on an updated parameter until track angles are within appropriate limits. The target track angles are compared 1312 to current active angles to identify a maximum absolute error and determine a master track to drive the corrective procedure. Speeds for each track are calculated 1314 and applied and the calculated target angles. As the machine approaches the correct path, a transitional mode may be applied to smoothly transition 1316 track angles from the corrective target angles to desired path specific angles which the machine can maintain after the corrective process. The process may then repeat as necessary.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method comprising:
   receiving a location corresponding to a desired center of rotation of a counter-rotate operation;
   determining an actuation value for each of a plurality of actuators corresponding to an angle of deflection for a corresponding track based on the desired center of rotation to maintain a rear extruding edge of a mold tangent to a rotational path defined by the desired center of rotation; and
   actuating one or more actuators to rotate one or more of the plurality of tracks to conform to the determined actuation value.

2. The method of claim 1, further comprising:
   receiving a desired path;
   determining a first arclength in the desired path;
   determining a center of rotation corresponding to the first arclength;
   determining an angle of deflection for each of the plurality of tracks to produce the desired arclength; and
   actuating one or more actuators to rotate one or more of a plurality of tracks to conform to the determined deflection.

3. The method of claim 2, wherein:
   each of the plurality of tracks is hydraulically driven; and
   the center of rotation of the counter rotate operation and angle of deflection for each track are configured such that a uniform hydraulic pressure may be applied to drive the plurality of tracks.

4. The method of claim 2, further comprising:
   measuring at least one path tracking error from a desired path;
   converting the at least one path tracking error to a deflection angle at one or more reference points on a construction machine;
   calculating one or more target reference point angles at the one or more reference points;
   adding the one or more target reference point angles to the deflection angle to produce a combined attack angle;

calculating a synchronized center of rotation based on a line-line intersection derived from the combined attack angle and one or more reference points;
actuating one or more actuators to rotate one or more tracks to a corresponding target track deflection; and
setting a travel speed for each track based on the synchronized center of rotation.

5. The method of claim 1, further comprising:
determining a travel speed for each of the plurality of tracks based on a set of functions correlating a track deflection and path radius to a travel speed for each track.

6. The method of claim 1, wherein:
each of the plurality of tracks is hydraulically driven; and
the center of rotation and angle of deflection for each track are configured such that a uniform hydraulic pressure may be applied to drive the plurality of tracks.

7. A construction machine comprising:
an extruding mold;
a plurality of tracks, each of the plurality of tracks associated with at least one of a plurality of actuators, the at least one of the plurality of actuators configured to rotate the corresponding track; and
at least one processor configured via processor executable code to:
receive a desired path;
determine a first arclength in the desired path;
determine a center of rotation corresponding to the first arclength;
determine an angle of deflection for each of the plurality of tracks to produce the desired arclength; and
actuate one or more actuators to rotate one or more of the plurality of tracks to conform to the determined deflection and maintain a rear extruding edge of the extruding mold tangent to a rotational path defined by the desired center of rotation.

8. The construction machine of claim 7, wherein the at least one processor is further configured to:
measure at least one path tracking error from the desired path;
convert the at least one path tracking error to a deflection angle at one or more reference points on the construction machine;
calculate one or more target reference point angles at the one or more reference points;
add the one or more target reference point angles to the deflection angle to produce a combined attack angle;
calculate a synchronized center of rotation based on a line-line intersection derived from the combined attack angle and one or more reference points;
actuate one or more actuators to rotate one or more tracks to a corresponding target track deflection; and
set a travel speed for each track based on the synchronized center of rotation.

9. The construction machine of claim 7, wherein the at least one processor is further configured to:
receive a location corresponding to a desired center of rotation of a counter-rotate operation;
determine an angle of deflection for each of the plurality of tracks corresponding to the desired center of rotation; and
actuate one or more actuators to rotate one or more of the plurality of tracks to conform to the determined deflection.

10. The construction machine of claim 9, wherein:
each of the plurality of tracks is hydraulically driven; and
the center of rotation of the counter rotate operation and angle of deflection for each track are configured such that a uniform hydraulic pressure may be applied to drive the plurality of tracks.

11. The construction machine of claim 7, wherein the at least one processor is further configured to:
determine a travel speed for each of the plurality of tracks based on a set of functions correlating a track deflection and path radius to a travel speed for each track.

12. The construction machine of claim 7, wherein:
each of the plurality of tracks is hydraulically driven; and
the center of rotation and angle of deflection for each track are configured such that a uniform hydraulic pressure may be applied to drive the plurality of tracks.

13. The construction machine of claim 7, further comprising:
a user interface device in data communication with the at least one processor,
wherein the at least one processor is further configured to:
receive an input from the user interface device corresponding to a desired center of rotation;
correlate the desired center of rotation with a track deflection and track speed with relation to a set of functions correlating track deflections and track speeds with a radius of a path.

14. A computer apparatus comprising:
at least one processor;
a plurality of actuators in data communication with the processor, each corresponding to a track, at least one of the plurality of actuators configured to rotate the corresponding track;
a memory in data communication with the at least one processor, storing processor executable code for configuring the at least one processor to:
receive a location corresponding to a desired center of rotation of a counter-rotate operation;
determine an actuation value for each of the plurality of actuators corresponding to an angle of deflection for corresponding track based on the desired center of rotation to maintain a rear extruding edge of a mold tangent to a rotational path defined by the desired center of rotation; and
actuate one or more actuators to rotate one or more of the plurality of tracks to conform to the determined actuation value.

15. The computer apparatus of claim 14, wherein the processor executable code further configures the at least one processor to:
measure at least one path tracking error from the desired path;
convert the at least one path tracking error to a deflection angle at one or more reference points on a construction machine;
calculate one or more target reference point angles at the one or more reference points;
add the one or more target reference point angles to the deflection angle to produce a combined attack angle;
calculate a synchronized center of rotation based on a line-line intersection derived from the combined attack angle and one or more reference points;
actuate one or more actuators to rotate one or more tracks to a corresponding target track deflection; and
set a travel speed for each track based on the synchronized center of rotation.

16. The computer apparatus of claim 14, wherein the processor executable code further configures the at least one processor to:

receive a desired path;

determine a first arclength in the desired path;

determine a center of rotation corresponding to the first arclength;

determine an angle of deflection for each of the plurality of tracks to produce the desired arclength; and actuate one or more actuators to rotate one or more of the plurality of tracks to conform to the determined deflection.

17. The computer apparatus of claim 16, wherein:

each of the plurality of tracks is hydraulically driven; and the center of rotation of the counter rotate operation and angle of deflection for each track are configured such that a uniform hydraulic pressure may be applied to drive the plurality of tracks.

18. The computer apparatus of claim 14, wherein the processor executable code further configures the at least one processor to:

determine a travel speed for each of the plurality of tracks based on a set of functions correlating a track deflection and path radius to a travel speed for each track.

19. The computer apparatus of claim 14, wherein:

each of the plurality of tracks is hydraulically driven; and the center of rotation and angle of deflection for each track are configured such that a uniform hydraulic pressure may be applied to drive the plurality of tracks.

20. The computer apparatus of claim 14, further comprising:

a user interface device in data communication with the at least one processor, wherein the processor executable code further configures the at least one processor to:

receive an input from the user interface device corresponding to a desired center of rotation;

correlate the desired center of rotation with a track deflection and track speed with relation to a set of functions correlating track deflections and track speeds with a radius of a path.

* * * * *